(12) United States Patent
Gshwind

(10) Patent No.: US 9,280,349 B2
(45) Date of Patent: *Mar. 8, 2016

(54) DECODE TIME INSTRUCTION OPTIMIZATION FOR LOAD RESERVE AND STORE CONDITIONAL SEQUENCES

(71) Applicant: International Business Machines Corporation, Armonk, NY (US)

(72) Inventor: Michael K. Gshwind, Chappaqua, NY (US)

(73) Assignee: International Business Machines Corporation, Armonk, NY (US)

( * ) Notice: Subject to any disclaimer, the term of this patent is extended or adjusted under 35 U.S.C. 154(b) by 322 days.

This patent is subject to a terminal disclaimer.

(21) Appl. No.: 13/783,985

(22) Filed: Mar. 4, 2013

(65) Prior Publication Data

US 2013/0262830 A1    Oct. 3, 2013

Related U.S. Application Data

(63) Continuation of application No. 13/432,404, filed on Mar. 28, 2012.

(51) Int. Cl.
*G06F 9/30* (2006.01)
*G06F 9/38* (2006.01)

(52) U.S. Cl.
CPC .......... *G06F 9/30196* (2013.01); *G06F 9/3004* (2013.01); *G06F 9/3017* (2013.01); *G06F 9/30043* (2013.01); *G06F 9/30087* (2013.01); *G06F 9/30145* (2013.01); *G06F 9/3844* (2013.01)

(58) Field of Classification Search
CPC ............ G06F 9/30145; G06F 9/30196; G06F 9/30087; G06F 9/30043
See application file for complete search history.

(56) References Cited

U.S. PATENT DOCUMENTS

| | | | |
|---|---|---|---|
| 5,416,666 A | 5/1995 | Maguire, Jr. | |
| 6,257,774 B1 | 7/2001 | Stack | |
| 6,298,436 B1 * | 10/2001 | Kahle et al. | 712/220 |
| 6,321,380 B1 | 11/2001 | Derrick et al. | |
| 7,295,528 B2 | 11/2007 | Ibrahim et al. | |
| 7,555,636 B2 | 6/2009 | Brenner | |
| 7,627,723 B1 * | 12/2009 | Buck et al. | 711/155 |
| 7,689,886 B2 | 3/2010 | Arora et al. | |
| 7,831,815 B2 * | 11/2010 | Greenhalgh et al. | 712/227 |
| 2006/0010297 A1 | 1/2006 | Brenner | |
| 2007/0016733 A1 | 1/2007 | Day et al. | |
| 2008/0276069 A1 | 11/2008 | Blaner et al. | |
| 2011/0208915 A1 | 8/2011 | Bannon et al. | |
| 2011/0264891 A1 | 10/2011 | Parks | |
| 2012/0144120 A1 | 6/2012 | Serebrin et al. | |

FOREIGN PATENT DOCUMENTS

| | | |
|---|---|---|
| CN | 1122929 A | 5/1996 |
| CN | 101546272 | 9/2009 |
| EP | 0071028 A2 | 2/1983 |
| WO | WO9735250 | 9/1997 |

OTHER PUBLICATIONS

International Application No. PCT/IB2013/051232, International Search Report and Written Opinion dated Jul. 18, 2013; 7 pages.
European Search Report for International Application No. 13769711. 6-1957/2805516 PCT/IB2013051232; Reference No. POU920120042EP1; dated Feb. 4, 2015; pp. 1-6.

* cited by examiner

*Primary Examiner* — Benjamin Geib
(74) *Attorney, Agent, or Firm* — Cantor Colburn LLP; William A. Kinnaman, Jr.

(57) ABSTRACT

A technique is provided for replacing an atomic sequence. A processing circuit receives the atomic sequence. The processing circuit detects the atomic sequence. The processing circuit generates an internal atomic operation to replace the atomic sequence.

6 Claims, 15 Drawing Sheets

| Detected Power ISA code with load reserve and store conditional to be translated into internal atomic operations |
|---|
| • atomic increment:<br>retry:<br>  lwarx  r4, 0, r3  // Read integer from RAM into r4, placing reservation.<br>  addi   r4, r4, 1   // Add 1 to r4.<br>  stwcx. r4, 0, r3  // Attempt to store incremented value back to RAM.<br>  bne-  retry       // If the store failed (unlikely), retry.<br><br>• atomic decrement:<br>retry:<br>  lwarx  r4, 0, r3  // Read integer from RAM into r4, placing reservation.<br>  addi   r4, r4, -1  // Subtract 1 from r4.<br>  stwcx. r4, 0, r3  // Attempt to store incremented value back to RAM.<br>  bne-  retry       // If the store failed (unlikely), retry.<br><br>• atomic add:<br>retry:<br>  lwarx  r4, 0, r3  // Read integer from RAM into r4, placing reservation.<br>  add    r4, r4,r8  // Add r8 to r4.<br>  stwcx. r4, 0, r3  // Attempt to store incremented value back to RAM.<br>  bne-  retry       // If the store failed (unlikely), retry. |

Detected Power ISA code with load reserve and store conditional to be translated into internal atomic operations

- atomic subtract:

```
retry:
  lwarx  r4, 0, r3   // Read integer from RAM into r4, placing reservation.
  sub    r4, r4, r8  // Subtract r8 from r4.
  stwcx. r4, 0, r3   // Attempt to store incremented value back to RAM.
  bne-   retry       // If the store failed (unlikely), retry.
```

- atomic exchange:

```
retry:
  lwarx  r4, 0, r3   // Read integer from RAM into r4, placing reservation.
  stwcx. r5, 0, r3   // Attempt to store r5 value back to RAM.
  bne-   retry       // If the store failed (unlikely), retry.
```

...

FIG. 5
Pseudocode for OAE 500

Analysis by optimization engine

```
IF (decoder0_lwarx AND decoder1_addi AND
decoder2_stwcx AND decoder3_branch AND decoder0_target ==
decoder1_rs1 AND decoder1_target == decoder1_rs1 AND
decoder2_target == decoder1_target AND decoder0_rs1 ==
decoder2_rs1 AND decoder0_rs2 == decoder2_rs2 AND
decoder3_bne AND decoder3_offset = -16)
   decoder0_atomic <= TRUE;
   decoder0_op <= atomic_add;
   decoder0_immediate <= decoder1_immediate;
   decoder0_suppress <= FALSE;
   decoder1_suppress <= TRUE;
   decoder2_suppress <= TRUE;
   decoder3_suppress <= TRUE;
ELSIF ...
```

510
515

Detects and replaces example pattern

```
retry:
   lwarx   r4, 0, r3
   addi    r4, r4, immediate
   stwcx.  r4, 0, r3
   bne-    retry
```
505

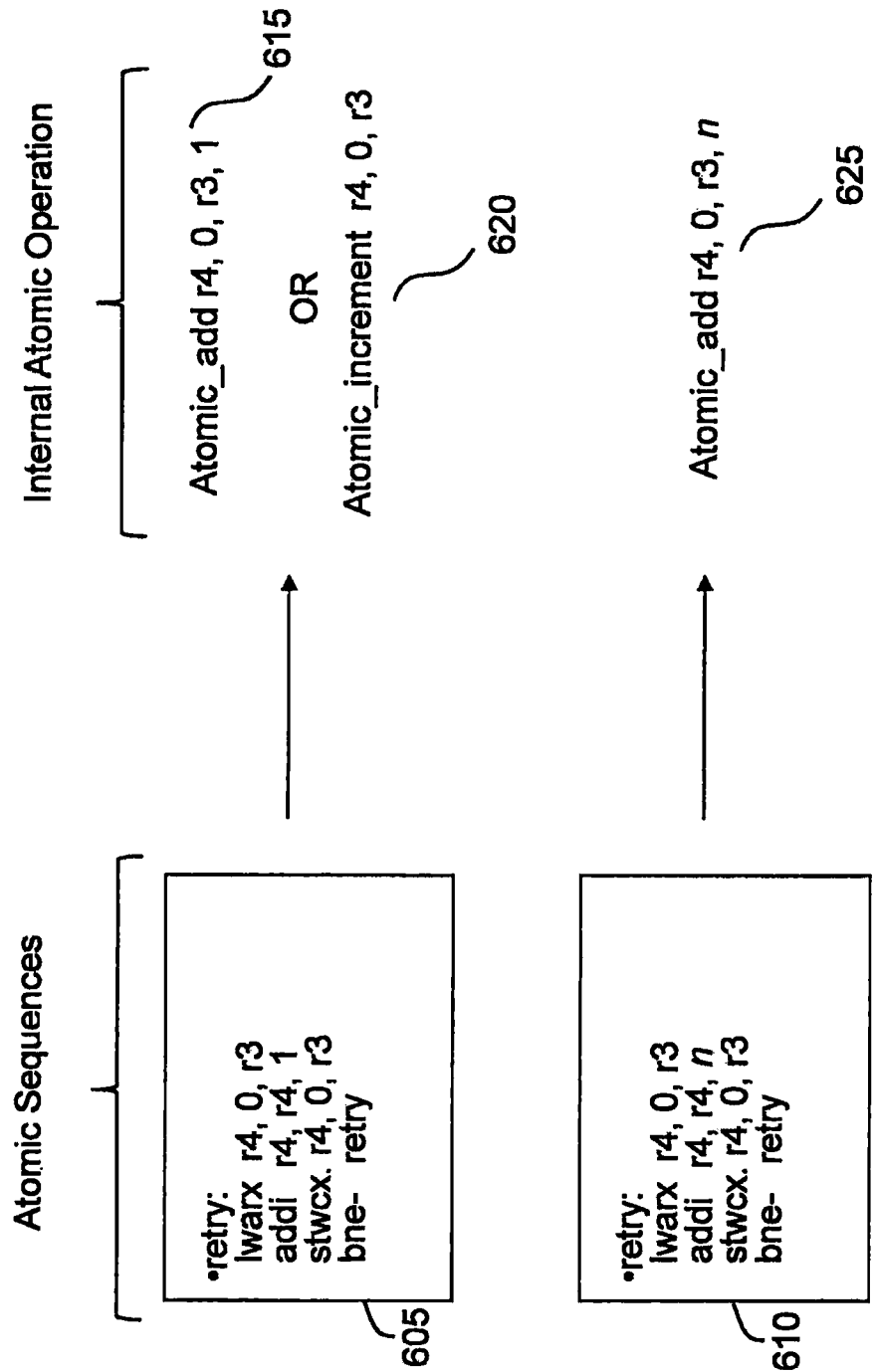

1200

Receive, by a processing circuit, the atomic sequence 1205

Detect, by the processing circuit, the atomic sequence 1210

Generate, by the processing circuit, an internal atomic operation to replace the atomic sequence 1215

DECODE TIME INSTRUCTION OPTIMIZATION FOR LOAD RESERVE AND STORE CONDITIONAL SEQUENCES

CROSS-REFERENCE TO RELATED APPLICATIONS

This application is a continuation of U.S. Non-Provisional application Ser. No. 13/432,404, entitled "DECODE TIME INSTRUCTION OPTIMIZATION FOR LOAD RESERVE AND STORE CONDITIONAL SEQUENCES", filed Mar. 28, 2012, which is incorporated herein by reference in its entirety.

BACKGROUND

The present invention relates generally to decode time instruction optimization, and more specifically, to optimization for load reserve and store conditional sequences. In the Power ISA®, the load reserve function is implemented by the Load Word and Reserve Indexed (lwarx) and the store conditional function is implemented by the Store Double Word Conditional Indexed (stwcx). The stwcx and lwarx instructions are primitive, or simple, instructions used to perform a read-modify-write operation to storage. If the store is performed responsive to a store conditional, the use of the stwcx and lwarx instructions ensures that no other processor or mechanism has modified the target memory location between the time the lwarx instruction is executed and the time the stwcx instruction completes.

Further information can be found in "Power ISA™ Version 2.06 Revision B" published Jul. 23, 2010 from IBM® herein incorporated by reference in its entirety. In some implementations of the Power ISA®, additional load reserve and store conditional instructions are optionally provided for other data widths.

Additional information can be found in "64-bit PowerPC ELF Application Binary Interface Supplement 1.9" (2004) from IBM® and incorporated by reference herein in its entirety.

Also, information can be found in "Power Architecture® 32-bit Application Binary Interface Supplement 1.0 Linux®" (Apr. 19, 2011) and "Power Architecture® 32-bit Application Binary Interface Supplement 1.0-Embedded" (Apr. 19, 2011), both of which are incorporated by reference herein in their entirety.

SUMMARY

Embodiments include a method for replacing an atomic sequence. The processing circuit receives the atomic sequence. The processing circuit detects the atomic sequence. The processing circuit generates an internal atomic operation to replace the atomic sequence.

Additional features and advantages are realized through the techniques of the present invention. Other embodiments and aspects of the invention are described in detail herein and are considered a part of the claimed invention. For a better understanding of the invention with advantages and features, refer to the description and to the drawings.

BRIEF DESCRIPTION OF THE SEVERAL VIEWS OF THE DRAWINGS

The subject matter which is regarded as the invention is particularly pointed out and distinctly claimed in the claims at the conclusion of the specification. The forgoing and other features, and advantages of the invention are apparent from the following detailed description taken in conjunction with the accompanying drawings in which:

FIG. 3 is a table illustrating example detected atomic sequences according to an embodiment;

FIG. 4 is a table illustrating example detected atomic sequences according to an embodiment;

FIG. 5 is a block diagram illustrating pseudocode for detecting atomic sequences and generating an internal atomic operation to replace the detected atomic sequence according to an embodiment;

FIG. 6 is a block diagram showing atomic sequences translated to a corresponding internal atomic operation according to an embodiment;

DETAILED DESCRIPTION

Exemplary embodiments provide decode time instruction optimization (DTIO) in a processing circuit/core to replace an atomic sequence with an (single) internal atomic operation. The technique detects the load reserve and store conditional instructions in the atomic sequence, and generates the internal atomic operation to replace the atomic sequence.

Decode time instruction optimization is discussed in U.S. patent application Ser. No. 13/251,793 entitled "Linking Code For An Enhanced Application Binary Interface (ABI) With Decode Time Instruction Optimization" filed Oct. 3, 2011, which is herein incorporated by reference in its entirety. U.S. patent application Ser. No. 13/251,793 discusses an "embodiment of the present invention is directed to minimizing the impact of table of contents (TOC) overflow on performance and throughput in a computing system. An embodiment includes a compiler tailored to generate object code to include specified instruction sequences (e.g., sequences that have been inserted into the code in order to compensate for TOC overflow). The instruction sequences are adapted to be recognized by hardware such that a microprocessor can optimize the sequence for internal execution. Upon locating one of the specified instruction sequences, the microprocessor either replaces an instruction(s) in the sequence with an internal instruction(s) that executes more efficiently, or replaces instructions in the sequence with a single internal instruction. This process performed by the microprocessor is referred to herein as decode time instruction optimization (DTIO). The DTIO process is a hardware process. The compiler and the linker described herein prepare code sequences for optimization by the hardware. These code sequences are coded by the compiler and/or linker in a manner to be detected by DTIO enabled hardware, such as such as particular instructions being adjacent to each other, having a suitable displacement range when the displacement range is limited, having suitable properties such as being destructive when a processor has requirements on destructive code forms to enable DTIO, and being suitably aligned when a processor has requirements on instruction alignment to enable DTIO, and any other such properties as may be required by DTIO enabled hardware. DTIO enabled hardware is further described in U.S. patent application titled "Scalable Decode-time Instruction Sequence Optimization of Dependent Instructions". Ser. No. 13/251,409, filed Oct. 3, 2011 which is incorporated herein by reference in its entirety."

In a state of the art processor using decode time instruction optimization, the state of the art processor needs to repeat optimization every time instructions are fetched. This is an overhead in energy, complexity, and possibly latency, and also limits optimizations which can be done to avoid adding latency.

Figure 1A:
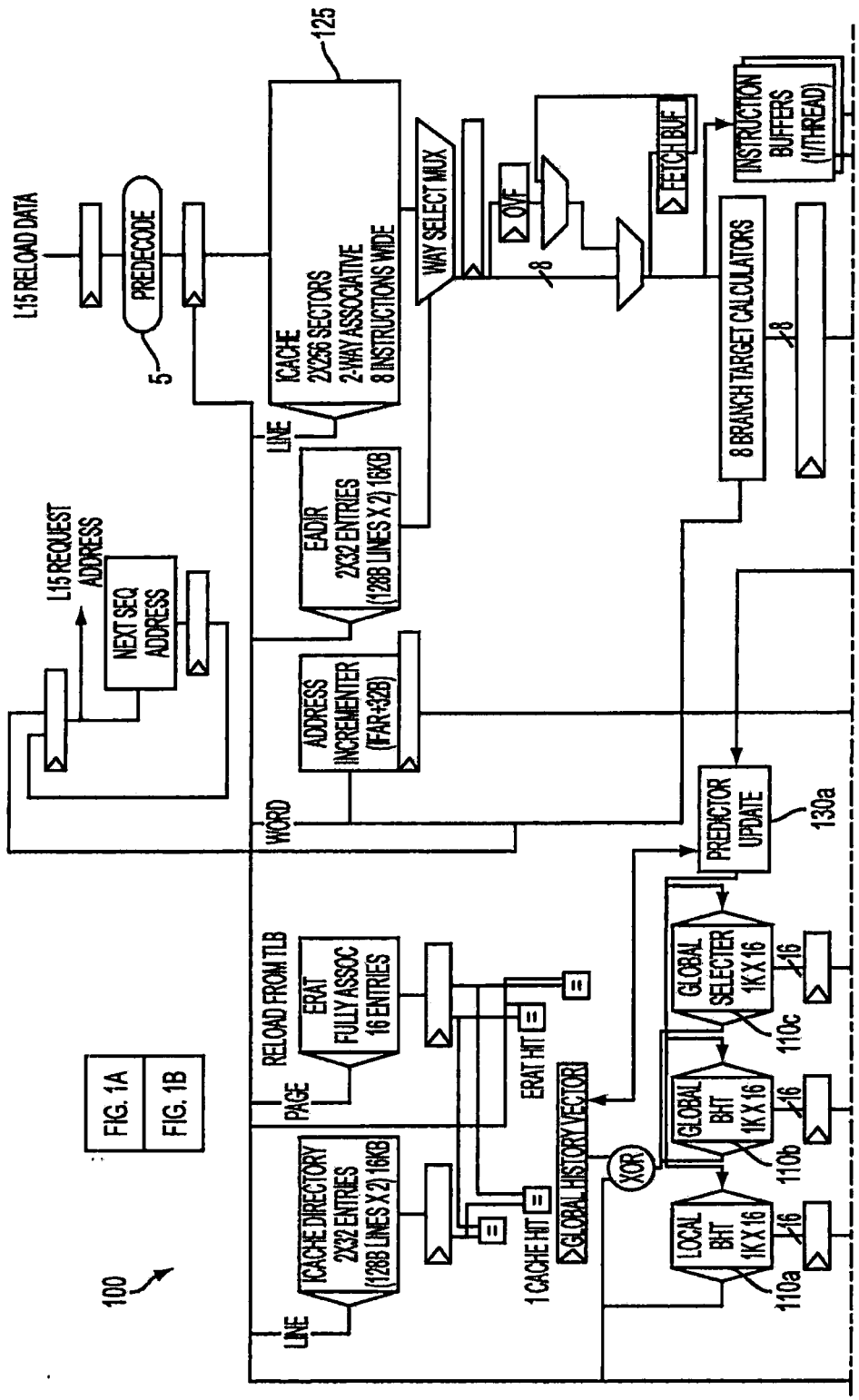
FIGS. 1A and 1B are a block diagram of a processor core generally shown according to an embodiment.
Figure 1B:
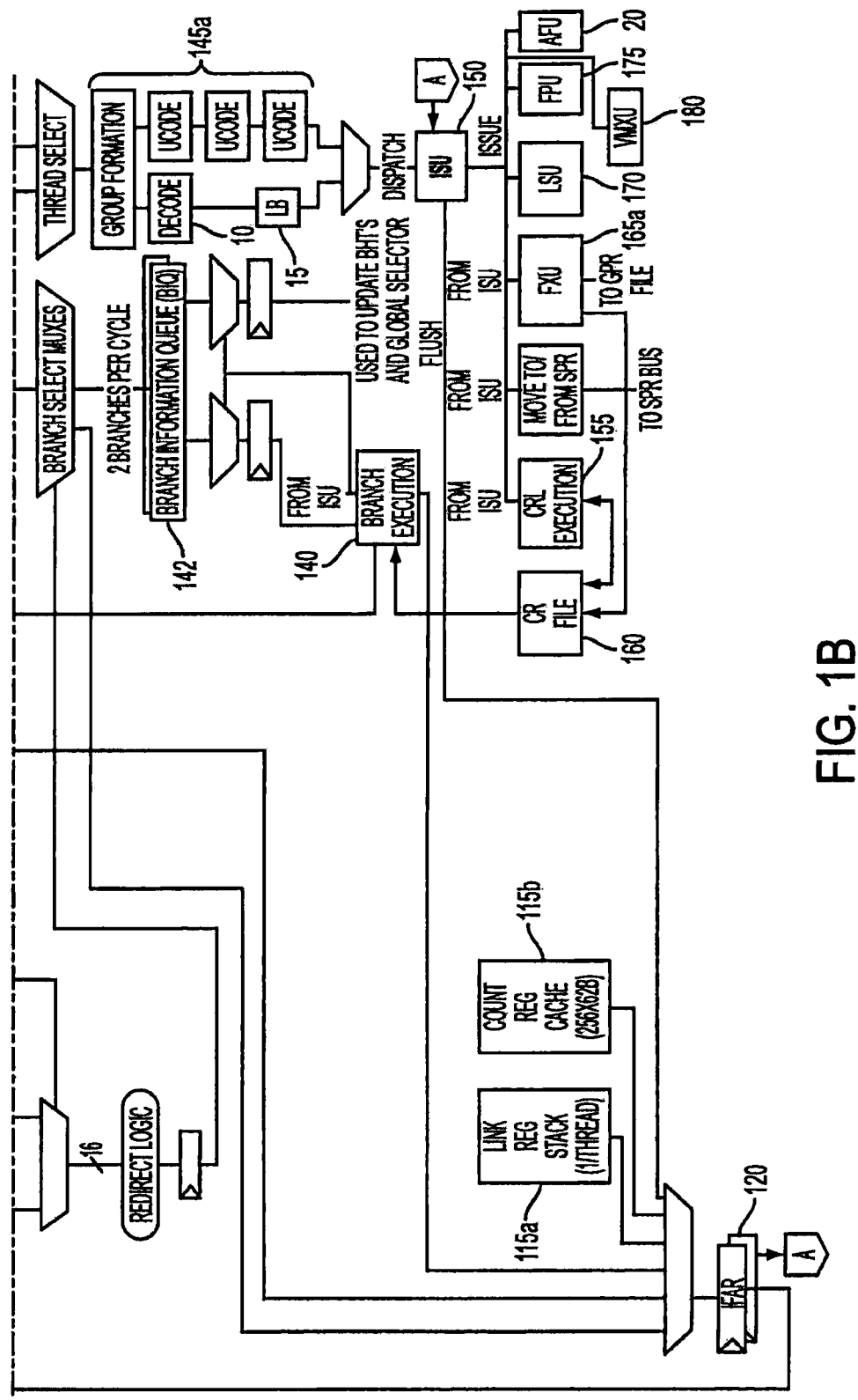

Exemplary embodiments provide optimization capabilities which can be added in the decode stage (and/or predecode stage) of the processor for the load reserve and store conditional instructions, which are used to construct a sequence of instructions that appear to perform an atomic update operation on an aligned storage location. FIGS. 1A and 1B illustrate a processor core (circuitry) 100 with logic (i.e., hardware circuits configured to implement logic) for decode time instruction creation according to an embodiment. Note that general description of a processor is provided to show an example of how the decode time instruction optimization may be implemented. The processor core 100 includes, among other things, prediction hardware, registers, caches, decoders, an instruction sequencing unit (ISU) 150, and instruction execution units. In particular, the prediction hardware includes Local Branch History Table (BHT) 110a, Global Branch History Table (BHT) 110b, and Global Selector 110c. The prediction hardware is accessed through an Instruction Fetch Address Register (IFAR) 120, which has the address for the next instruction fetch. In one embodiment, an instruction cache 125 fetches a plurality of instructions referred to as a "fetch group".

The cache and prediction hardware are accessed at approximately the same time with the same address. If the prediction hardware has prediction information available for an instruction in the fetch group, that prediction is forwarded to the ISU 150, which, in turn, issues instructions to units for execution. The prediction may be used to update the IFAR 120 in conjunction with branch target calculation and branch target prediction hardware (such as a link register prediction stack and a count register cache). If no prediction information is available, but the instruction decoders find a branch instruction in the fetch group, a prediction is created for that fetch group, stored in the prediction hardware and forwarded to the ISU 150.

The Branch Execution Unit (BRU) 140 operates in response to instructions issued to it by the ISU 150. The BRU 140 has read access to the condition register file 160. The Branch Execution Unit 140 further has access to information stored by the branch scan logic in the Branch Information Queue 142, to determine the success of a branch prediction, and is operatively coupled to the instruction fetch address register(s) (IFAR) 120 corresponding to the one or more threads supported by the microprocessor. The BRU 140 is further operatively coupled to cause a predictor update when the BRU 140 discovers a branch misprediction.

When the instruction is executed, the BRU 140 detects if the prediction is wrong. If so, the prediction needs to be updated. For this purpose, the processor in FIG. 1A also includes predictor update logic 130a. The predictor update logic 130a is responsive to an update indication from Branch Execution Unit 140 and configured to update array entries in one or more of the Local BHT 110a, Global BHT 110b, and Global Selector 110c. The predictor hardware 110a, 110b, and 110c may have write ports distinct from the read ports used by the instruction fetch and prediction operation, or a single read/write port may be shared. The predictor update logic 130a may further be operatively coupled to the link stack 115a and counter register stack 115b.

Referring now to the condition register file (CRF) 160, the CRF 160 is read-accessible by the BRU 140 and can be written by execution units including but not limited to the Fixed Point Unit (FXU) 165a, Floating Point Unit (FPU) 175 and Vector Multimedia eXtension Unit (VMXU) 180. The Condition Register Logic Execution unit (CRL execution) 155 (also referred to as the CRU) and SPR handling logic have read and write access to the Condition Register File (CRF) 160 (access to CRF 160 from SPR handling logic not shown in the interest of simplifying illustration). The CRU 155 performs logical operations on the condition registers stored in the CRF file 160. The FXU 165a is able to perform write updates to the CRF 160.

Figure 2:
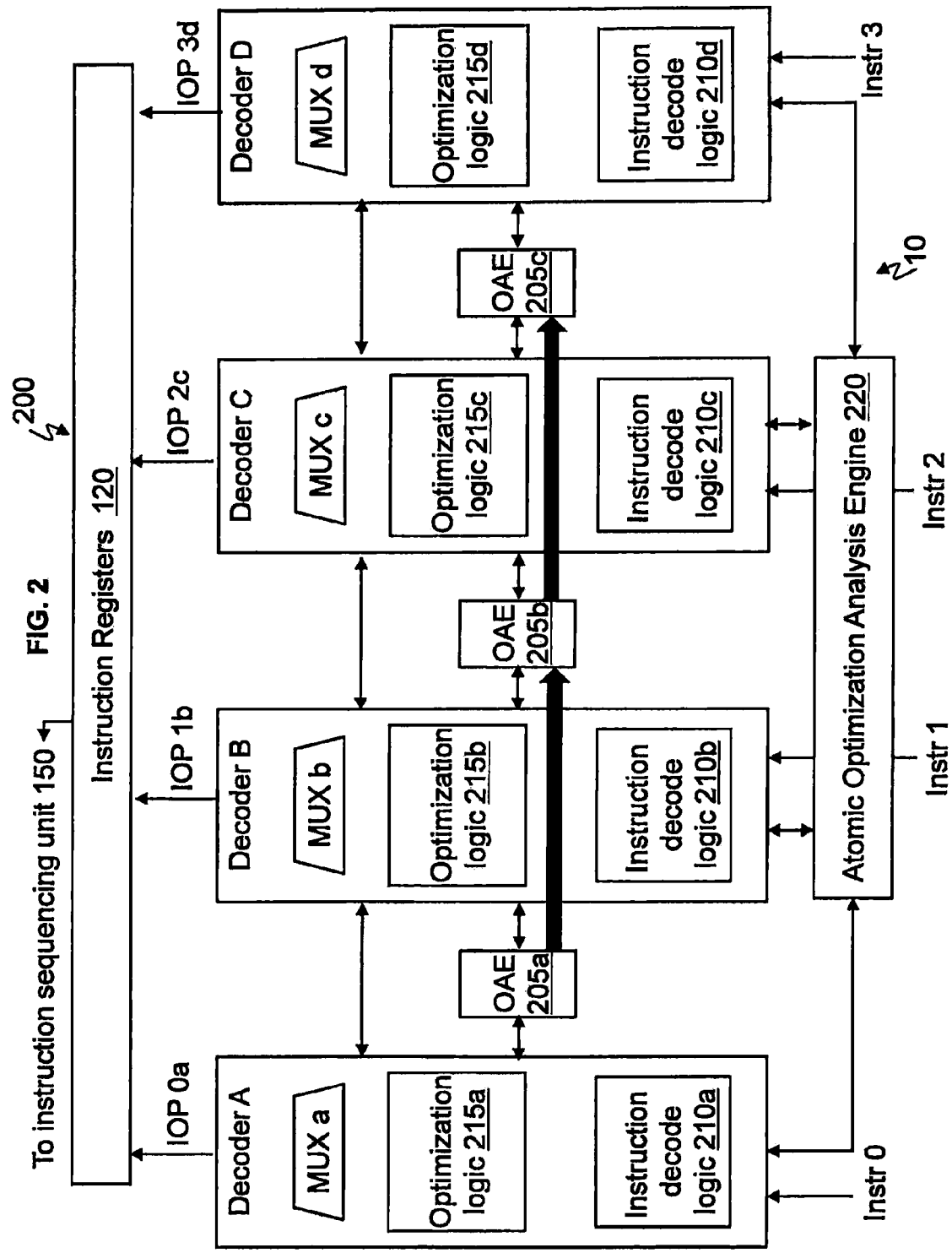
FIG. 2 is a block diagram illustrating receiving instructions, detecting an atomic sequence in the instructions, and generating an internal atomic operation to replace the detected atomic sequence according to an embodiment.

The processor core 100 includes an instruction decoder 10 according to an embodiment. Optimization is performed in the instruction decoder 10 located after the instruction cache unit 125 at decode time. The instruction decoder 10 can detect an atomic sequence (having multiple instructions) and change (translate) the detected atomic sequence into a single internal atomic operation. One or more atomic function units (AFU) 20 can execute the optimization (i.e., the singe internal atomic operation) provided/determined by the instruction decoder 10 in one embodiment. In another embodiment, a nest atomic unit (NAU) 1010 shown in FIGS. 10 and 11 can execute the single internal atomic operation. In addition (and/or in an alternative) to the instruction decoder 10 detecting the atomic instruction sequence and generating a new single internal atomic operation, a predecode optimizer 5 may include predecode logic for predecode time instruction optimization. The predecode optimizer 5 is configured to detect the atomic instruction sequence and generate the new single internal atomic operation prior to caching by the instruction cache 125, e.g., during cache reload. Accordingly, the single internal atomic operation detected and determined (by the predecode optimizer 5) can be executed by the AFU 20 and/or NAU 1010. Note that any discussion of the functionality of the instruction decoder 10 for detecting the atomic instruction sequence and generating the new single internal atomic operation to replace the atomic instruction sequence analogously applies to the predecode optimizer 5. Additionally, the LSU 170 (load store unit) may be configured with the functionality of the AFU 20 (without requiring a separate AFU engine), and the LSU 170 can execute the single internal atomic operation. Also, a loop buffer 15 may be added to capture each of the decoded single internal atomic operations that have been generated by the instruction decoder 10. The internal atomic operations may be output from the decoder 10 as (internal atomic operation) iop 0a, iop 1b, iop 2c, and/or iop 3d as shown in FIG. 2.

Embodiments discussed herein may be combined and implemented in any manner, and the present disclosure describing example scenarios and implementations is not meant to be limited.

Indeed, embodiments provide a mechanism (e.g., decoder 10 and/or predecode optimizer 5) to identify a sequence of instructions that together implement an atomic operation, and internally translate those sequence of instructions to an internal operation that represents the atomic operation as an internal atomic operation. Thus, today, on a Power ISA™ implementing RISC primitives such as load reserve and store conditional, a value in memory is atomically updated by acquiring a data item using load reserve, and updating (via store condition) occurs if no interference has been recorded with the reserved data item. "Power ISA™ Version 2.06 Revision B" published Jul. 23, 2010 from IBM® and incorporated by reference herein in its entirety teaches an example reduced instruction set computer (RISC) instruction set architecture (ISA). The Power ISA™ will be used herein in order to demonstrate example embodiments. However, the present disclosure is not limited to Power ISA™ or RISC architectures. Those skilled in the art will readily appreciate use of the teachings disclosed herein in a variety of architectures. "z/Architecture Principles of Operation" SA22-7832-08, Ninth Edition (August, 2010) from IBM® and incorporated by reference herein in its entirety teaches an example CISC (complex instruction set computer) instruction set architecture.

Because the atomic operation is performed using a plurality/sequence of instructions, and in common microarchitectures, data can only be held for at most one instruction; the atomic instruction sequence cannot hold the data item to avoid interference from other accesses in a computer system, resulting in a less efficient implementation. Also, because of the sequence of instructions, latency to the coherence point is incurred multiple times, as opposed to an internal atomic operation, where this transfer can be performed only once, for the entire internal atomic operation.

Now turning to FIG. 2, a block diagram 200 illustrates further details of the instructions decoder 10 according to an embodiment. The instruction decoder 10 may include decoders A, B, C, and D and optimization analysis engines 205a, 205b, and 205c, along with an atomic optimization analysis engine 220. In one implementation, the functionality of the atomic optimization analysis engine 220 may be included in the optimization analysis engines 205a, 205b, and 205c, and the atomic optimization analysis engine 220 can be omitted (if desired). As such, any discussion of the atomic optimization analysis engine 220 applies to the optimization analysis engines 205a, 205b, and 205c.

In the instruction decoder 10, the optimization analysis engine (OAE) 205a is operatively connected to decoders A and B, the optimization analysis engine 205b is operatively connected to decoders B and C, and the optimization analysis engine 205c is operatively connected to decoders C and D.

The decoder A receives instruction 0 from the instruction cache 125, the decoder B receives instruction 1 from Icache 125, the decoder C receives instruction 2 from Icache 125, and the decoder D receives instruction 3 from Icache 125. The instruction decode logic 210a-210d respectively perform initial decoding on respective instructions 0, 1, 2, and 3 just received.

The instruction decode logic 210a provides its decoded instructions (representing instruction 0) to the atomic optimization analysis engine 220, to the OAE 205a, to multiplexer "a" (MUX) (e.g., to be selected when no optimization takes), and to optimization logic 215a and 215b, along with operand resource properties, operand specifiers, decoded instruction type, and decoded instruction properties.

The instruction decode logic 210b provides its decoded instructions (representing instruction 1) to the atomic optimization analysis engine 220, to multiplexer (MUX) "b" (e.g., to be selected when no optimization takes), to the OAE 205a, to OAE 205b, to optimization logic 215a, to optimization logic 215b, and to optimization logic 215c, along with operand resource properties, operand specifiers, decoded instruction type, and decoded instruction properties.

The instruction decode logic 210c provides its decoded instructions (representing instruction 2) to the atomic optimization analysis engine 220, to MUX "c" (e.g., to be selected when no optimization takes), to the OAE 205b, to OAE 205c, to optimization logic 215b, to optimization logic 215c, and to optimization logic 215d, along with operand resource properties, operand specifiers, decoded instruction type, and decoded instruction properties.

The instruction decode logic 210d provides its decoded instructions (representing instruction 3) to the atomic optimization analysis engine 220, to MUX "d" (e.g., to be selected when no optimization takes), to the OAE 205c, and to optimization logic 215c, and to optimization logic 215d, along with operand resource properties, operand specifiers, decoded instruction type, and decoded instruction properties.

The OAE 205a, OAE 205b, and OAE 205c are configured to compare the decoded instructions (including decoded characteristics) respectively received from example decoders A, B, C, and D to determine whether they correspond to one of the various atomic instruction sequences (that has a load reserve and store conditional sequence) that are candidates for optimization. Additionally, the atomic optimization analysis engine 220 is configured to compare the decoded instructions (including decoded characteristics) respectively received from example decoders A, B, C, and D to determine whether they correspond to one of the various atomic instruction sequences (that has a load reserve and store conditional sequence) that are candidates for optimization.

For any atomic instruction sequence (that has a load reserve and store conditional sequence), the OAE 205a-205c and/or the atomic optimization analysis engine 220 are configured to generate a single internal atomic operation for each particular decoded instruction (corresponding to each respective instruction 0, 1, 2, and 3). The atomic optimization analysis engine 220 draws input from the four successive decoders A, B, C, and D.

When the atomic sequence with a load reserve and store conditional is detected by at least one OAE 205a-205c, the output (i.e., the respective singe internal atomic operation generated by) from the OAE 205a is sent to optimization logic 215a and 215b and MUX a and b (as steering logic), from the OAE 205b is sent to optimization logic 215b and 215c and MUX b and c (as steering logic), and from the OAE 205c is sent to optimization logic 215c and 215d and MUX c and d (as steering logic).

Also, when the atomic sequence with a load reserve and store conditional is detected by the atomic optimization analysis engine 220, the output (i.e., the respective singe internal atomic operation generated by) from the atomic optimization analysis engine 220 is sent to optimization logic 215a, 215b, 215c, and 215d and MUX a, b, c, and d (as steering logic).

Further, the OAE 205*a*-205*c* and/or atomic optimization analysis engine 220 provides the steering logic to respective multiplexers a, b, c, and d to select one of an unoptimized iop generated by the initial decode operation, or iop corresponding to an iop in an optimized DTIO sequence which has been generated by optimization logic under control of the OAE/atomic optimization analysis engine control signals. Accordingly, the respective multiplexers a, b, c, and d will select the single internal atomic operation when present to respectively output iop 0*a*, iop 1*b*, iop 2*c*, and/or iop 3*d* to the instruction fetch address registers 120. Any internal atomic operation (iop) generated by the atomic optimization analysis engine 220 can be selected by the multiplexers a, b, c, and d as the respective output iop 0*a*, iop 1*b*, iop 2*c*, and/or iop 3*d* in place of the instructions corresponding to atomic sequences respectively detected in the instructions 0, 1, 2, and 3.

Also, in at least one embodiment, the OAEs 205*a*, 205*b*, and 205*c* communicate to prevent mutually exclusive actions. For example, an instruction in decoder B may be combined into an optimized sequence in conjunction with an instruction in decoder A to form an DTI-optimized sequence corresponding to original instructions 0 and 1, or may be combined into another optimized sequence in conjunction with an instruction in decoder C to form an DTI-optimized sequence corresponding to original instructions 1 and 2, but cannot be simultaneously DTI-optimized to be a part of optimizations occurring in conjunction with instructions in both decoders A and C. As a simple example, the sequence "addi r2, r2, 1; addi r2,r2,1; addi r2, r2,1" may be DTI-optimized by combining instructions 0 and 1 into "addi r2, r2, 2; addi r2, r2,1", or may be DTI-optimized by combining instructions 1 and 2 into "addi r2, r2, 1; addi r2, r2,2", but both optimizations performed in tandem would yield the incorrect sequence; also the sequence may be DTI-optimized by combining instructions 0 and 1 into "addi r2, r2, 2; addi r2, r2,2".

FIGS. 3 and 4 show tables 300 and 400 as exemplary detected atomic sequences having load reserve and store conditional, which may be detected by the predecode optimizer 5 and/or the instruction decoder 10 (e.g., via the OAE 205 and/or atomic optimization analysis engine 220). These detected atomic sequences are examples from Power ISA™ code, which include examples of atomic increment, atomic decrement, atomic add, atomic subtract, and atomic exchange, and each atomic sequence is translated into an internal atomic operation by the predecode optimizer 5 and/or the instruction decoder 10. There are numerous atomic sequences that are detected and replaced by a generated internal atomic operation (op), and exemplary embodiments are not meant to be limited. For example, an atomic compare and swap sequence may be an atomic sequence detected and replaced by an atomic internal operation. The atomic compare and swap (CAS) is an atomic CPU instruction used in multithreading to achieve synchronization, and the atomic compare and swap sequences compares the contents of a memory location to a given value, and only if they are the same, modifies the contents of that memory location to a given new value. The atomicity guarantees that the new value is calculated based on up-to-date information; if the value had been updated by another thread in the meantime, the write would fail. The result of the operation must indicate whether it performed the substitution.

FIG. 5 illustrates a table 500 with example pseudocode for OAE 205*a*-205*c*, atomic optimization analysis engine 220, and/or the predecode optimizer 5 according to an embodiment. The pseudocode may be utilized to detect and replace example (pattern) atomic sequence 505, and similar pseudocode may be utilized to detect and replace the atomic sequences in FIGS. 3 and 4. Block 510 of the pseudocode is designed to detect the atomic sequence 505 with the load reserve instruction lwarx, and with the store conditional instruction stwcx. Once the pseudocode detects/recognizes the atomic sequence 505, block 515 of the pseudocode is designed to change/replace the atomic sequence with a single internal atomic operation (i.e., one instruction that does not have a load reserve and store conditional sequence). Specifically, block 510 tests decoded outputs from decoders A to D (associated with signal names prefixed with decode0_to decode3_respectively) to ensure that each position in the 4 element decoded sequence corresponds to the respective instruction in the sequence 505. Block 515 assigns steering variables to indicate an atomic operation has been detected (decoder0_atomic) and causes the MUX a (e.g., in decoder A) to select the generated atomic internal operation to be passed to the rest of the processor core (e.g., processor core 100). An internal operation code "atomic_add" is assigned as the op to be output by decoder A and assigned to decoder0_op and corresponding to an atomic internal operation performing an atomic immediate operation in one exemplary embodiment. The immediate value to be used by the internal atomic operation is extracted from a signal decode1_immediate corresponding to decoder B, and assigned to a signal decoder0_immediate to be used by decoder A in conjunction with the internal atomic operation being generated. In addition, decoder0_suppress is set to FALSE to indicate that an operation is present and decoder1_suppress and decoder2_suppress and decoder3_suppress are set to TRUE to indicate that no operation is present and no internal operation should be emitted by decoders B, C and D. This pseudocode in the table 500 is designed to detect the atomic sequence 505 and it is understood that additional pseudocode would detect other atomic sequences.

Figure 7:
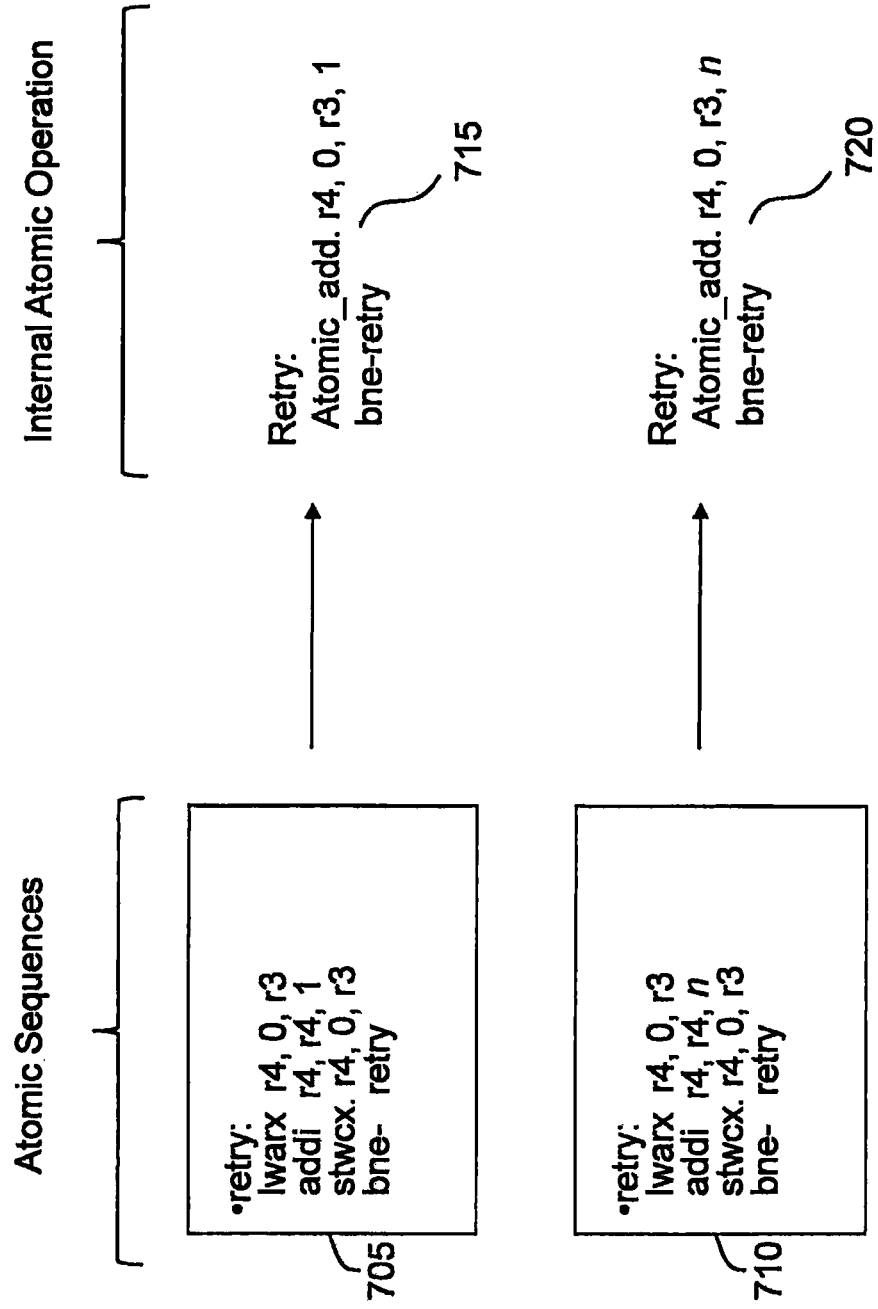
FIG. 7 is a block diagram also showing atomic sequences translated to a corresponding internal atomic operation according to an embodiment.

For example, FIGS. 6 and 7 are respective block diagrams 600 and 700, which illustrate example atomic sequences that have been respectively detected and changed into a single internal atomic operation by the OAE 205*a*-205*c*, the atomic optimization analysis engine 220, and/or the predecode optimizer 5. For conciseness, various operations and functionality may be discussed with respect to the atomic optimization analysis engine 220, but the same applies to the OAE 205*a*-205*c* and the predecode optimizer 5.

In FIG. 6, the atomic optimization analysis engine 220 is configured to detect the atomic sequence 605 and translate (and replace) the entire atomic sequence 605 into a single internal atomic operation 615 (which is a single command/instruction) which is Atomic_add r4, 0, r3, 1 in this example. The internal atomic operation 615 is an atomic add of 1. In one implementation, the atomic optimization analysis engine 220 is configured to translate atomic sequence 605 into internal atomic operation 620 which is Atomic_increment r4, 0, r3. The internal atomic operation 620 is an increment by a predefined amount (such as 1).

Similarly, the atomic optimization analysis engine 220 is configured to detect the atomic sequence 610 and translate (and replace) the entire atomic sequence 610 into a single internal atomic operation 625 which is Atomic_add r4, 0, r3, n. The internal atomic operation 625 adds by n amount (which represents a predefined number).

In FIG. 6, the atomic sequences 605 and 610 both have looping via the retry instruction, which will continue to loop until successfully completed. In generating the internal atomic operations 615, 620, and 625, the atomic optimization analysis engine 220 is configured such that the internal atomic operations 615, 620, and 625 respectively subsumes the looping (i.e., retry) of the atomic sequence 605 and 610.

However, no loops are included in the internal atomic operations 615, 620, and 625, because the atomic optimization analysis engine 220 subsumes that the internal atomic operations 615, 620, and 625 will always complete (without requiring a loop).

The atomic command (generated as the single internal atomic operation as discussed herein) is a directive to update a specific memory location safely within a parallel region. When using the atomic directive, this ensures that only one thread is writing to the memory location at a time, avoiding errors which might occur from simultaneous writes to the same memory location.

In accordance with an implementation of the atomic sequence 605, the lwarx instruction reads a 32 bit integer from memory (e.g., memory 1030 in FIGS. 10 and 11) into a register r4, placing a reservation. Reservations are "lost" when another access happens to the memory location for which a reservation is set. The addi instruction adds the value 1 to the value returned from memory and stored in register r4. The store conditional instruction stores the updated value from r4 back to the memory location for which the reservation was set by lwarx, if and only if the reservation set by lwarx has not been lost. If the store was successfully performed, the reservation has not been lost, indicating that no updates have been performed since the reservation was placed, and the store instruction updates condition register cr0 to indicate a value of EQUAL. If the store was not successfully performed, the reservation has been lost, indicating that updates have been performed since the reservation was placed and hence no atomic update is possible, and the store instruction updates condition register cr0 to indicate a value of NOT EQUAL. The bne instruction checks the value of condition register cr0, and if the status indicates NOT EQUAL, branches to the beginning of the sequence indicated by the exemplary label "retry" to reattempt execution of the sequence.

In accordance with an exemplary feature of the execution of "atomic_add" 615, atomic add is implemented in conjunction with a processor coherence protocol such as MESI, MOESI or other protocols known in the art, an execution unit obtains a data item at the specified address (e.g., register r3 with a zero displacement) for exclusive access. The coherence protocol is updated to not respond to coherence requests for a data item when the coherence protocol has been obtained in conjunction with an atomic operation, until execution of the atomic operation has been completed. The data value associated with the data item is accessed. The data value is incremented. The updated value is stored back to the data item for which exclusive access has been obtained. The instruction completes in accordance with instruction completion and coherence rules (for this example implementation). Only when the instruction completes is the address released from exclusive access status.

Those skilled in the art will further understand that if values corresponding to an original atomic sequence, such as register r4 or condition register cr0, may be read by other instructions, and write updates to these registers must be performed to reflect the semantics of the original instruction sequence, e.g., by storing the atomically incremented value in register r4, and indicating successful update by setting condition register cr0 to indicate a condition of "EQUAL".

In FIG. 7 (as one implementation), the atomic optimization analysis engine 220 does not generate a loop for single internal atomic operations 715 and 720 but the atomic optimization analysis engine 220 is configured to respectively repeat the internal atomic operations 715 and 720 if the internal atomic operation fails. The generated internal atomic operation (715 and/or 720) may fail and indicate repeat because the branch cannot be subsumed (by the atomic optimization analysis engine 220 generating the internal atomic operation) and/or because the designer (out of preference) prefers to build non-failing internal atomic operations.

In accordance with an exemplary feature of the execution of "atomic_add" 715, atomic add is implemented in conjunction with a processor coherence protocol such as MESI, MOESI or other protocols known in the art, an execution unit obtains a data item at the specified address (e.g., register r3 with a zero displacement) for exclusive access. The coherence protocol is updated to not respond to coherence requests for a data item when it has been obtained in conjunction with an atomic operation, until execution of the atomic operation has been completed. The data value associated with the data item is accessed. The data value is incremented. The updated value is stored back to the data item for which exclusive access has been obtained if possible. The instruction completes, in accordance with instruction completion and coherence rules in accordance with an implementation. Success is indicated by setting condition register cr0 to "EQUAL" and when the instructions completes is the address released from exclusive access status. In at least one aspect of execution of atomic add 715, the atomic update is not performed, e.g., because an implementation may yield the obtained data item to a higher priority requestor (such as including, but not limited to, an I/O request, or a higher priority process, or for ease of implementation). Failure of the atomic_add update is indicated by setting condition register cr0 to "NOT EQUAL" and the instructions completes and the address is released from exclusive access status. A conditional branch tests success of the operation, and reinitiates the execution of the atomic operation in the case of failure.

In FIG. 7, the atomic optimization analysis engine 220 is configured to detect the atomic sequence 705 and translate (and replace) the entire atomic sequence 705 into a single internal atomic operation 715 (which is a single command/instruction) which is Retry: Atomic_add. r4, 0, r3, 1 bne-retry. The internal atomic operation 715 is an atomic add of 1 that retries if unsuccessful. The atomic optimization analysis engine 220 is configured to detect the atomic sequence 710 and translate (and replace) the entire atomic sequence 710 into a single internal atomic operation 720 (which is a single command/instruction) which is Retry: Atomic_add. r4, 0, r3, n bne-retry. The internal atomic operation 720 is an atomic add of n amount that retries if unsuccessful.

Figure 8:
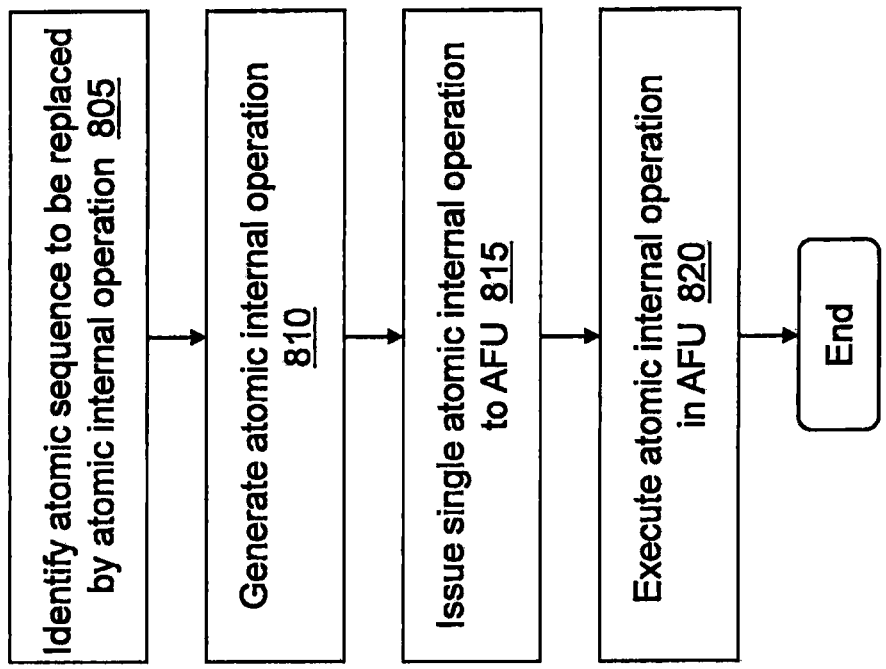
FIG. 8 is a flow chart of a method for detecting an atomic sequence, generating an internal atomic operation to replace the atomic sequence, and executing the internal atomic operation according to an embodiment.

FIG. 8 is flow chart 800 of a method of identifying an atomic sequence (having a load reserve (i.e., lwarx) command and store conditional (i.e., stwcx) command), and generating a single internal atomic operation to replace the atomic sequence according to an embodiment.

The atomic optimization analysis engine 220 is configured to identify/detect the atomic sequence (which is instructions from the instruction cache 125) that needs to be replaced by an internal atomic operation at block 805. The atomic optimization analysis engine 220 is configured to generate an atomic internal operation to replace the detected atomic sequence at block 810. The ISU 150 (in response to receiving the generated atomic internal operation from the instruction decoder 10) is configured to issue the single atomic internal operation (in place of the atomic sequence) to the AFU 20 at block 815. The AFU 20 is configured to execute the single atomic internal operation (in place of the atomic sequence) at block 820.

Figure 9:
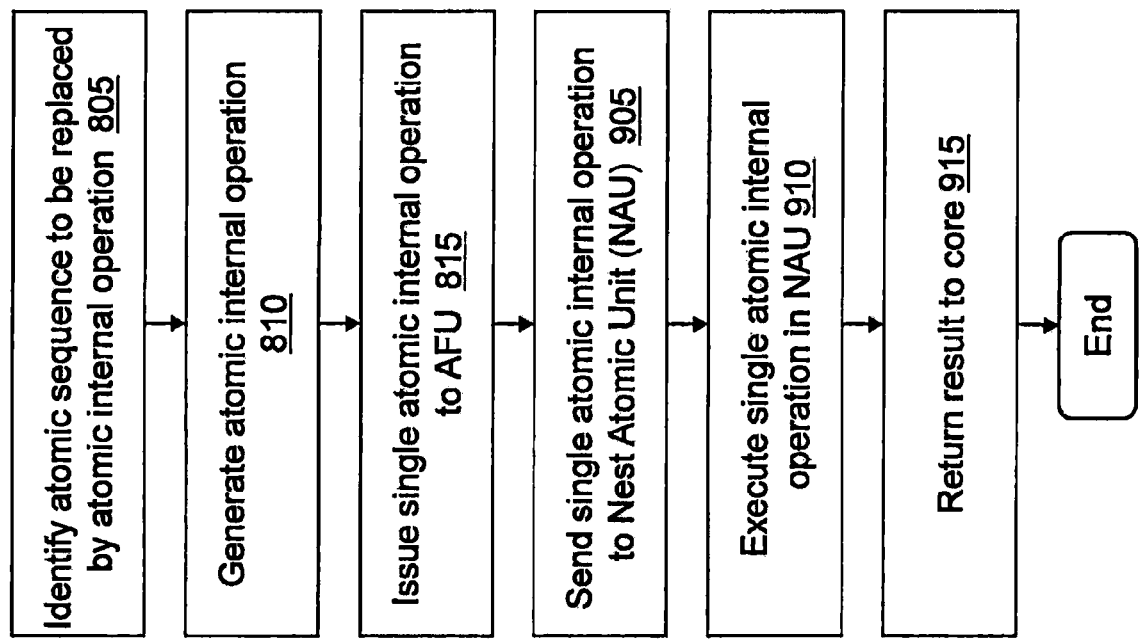
FIG. 9 is a flow chart of another method for detecting an atomic sequence, generating an internal atomic operation to replace the atomic sequence, and executing the internal atomic operation according to an embodiment.

FIG. 9 is flow chart 900 of a method of identifying an atomic sequence (having a load reserve (i.e., lwarx) instruction and store conditional (i.e., stwcx) instruction), and generating a single internal atomic operation to replace atomic sequence according to an embodiment. In FIG. 9, a nest atomic unit 1010 (in FIG. 10) is used to execute the single internal atomic operation in place of the AFU 20.

The atomic optimization analysis engine 220 is configured to identify/detect the atomic sequence (which are instructions from the instruction cache 125) that needs to be replaced by an internal atomic operation at block 805. The atomic optimization analysis engine 220 is configured to generate an atomic internal operation to replace the detected atomic sequence at block 810. The ISU 150 (in response to receiving the generated atomic internal operation from the instruction decoder 10) is configured to issue the single atomic internal operation (in place of the atomic sequence) to the AFU 20 at block 815. The AFU 20 is configured to send the atomic internal operation to the nest atomic unit (NAU) 1010 at block 905. The NAU 1010 is configured to execute the single atomic internal operation (in place of the atomic sequence) at block 915 and return the result (e.g., of the calculation) to the processor core 100 at block 915.

Figure 10:
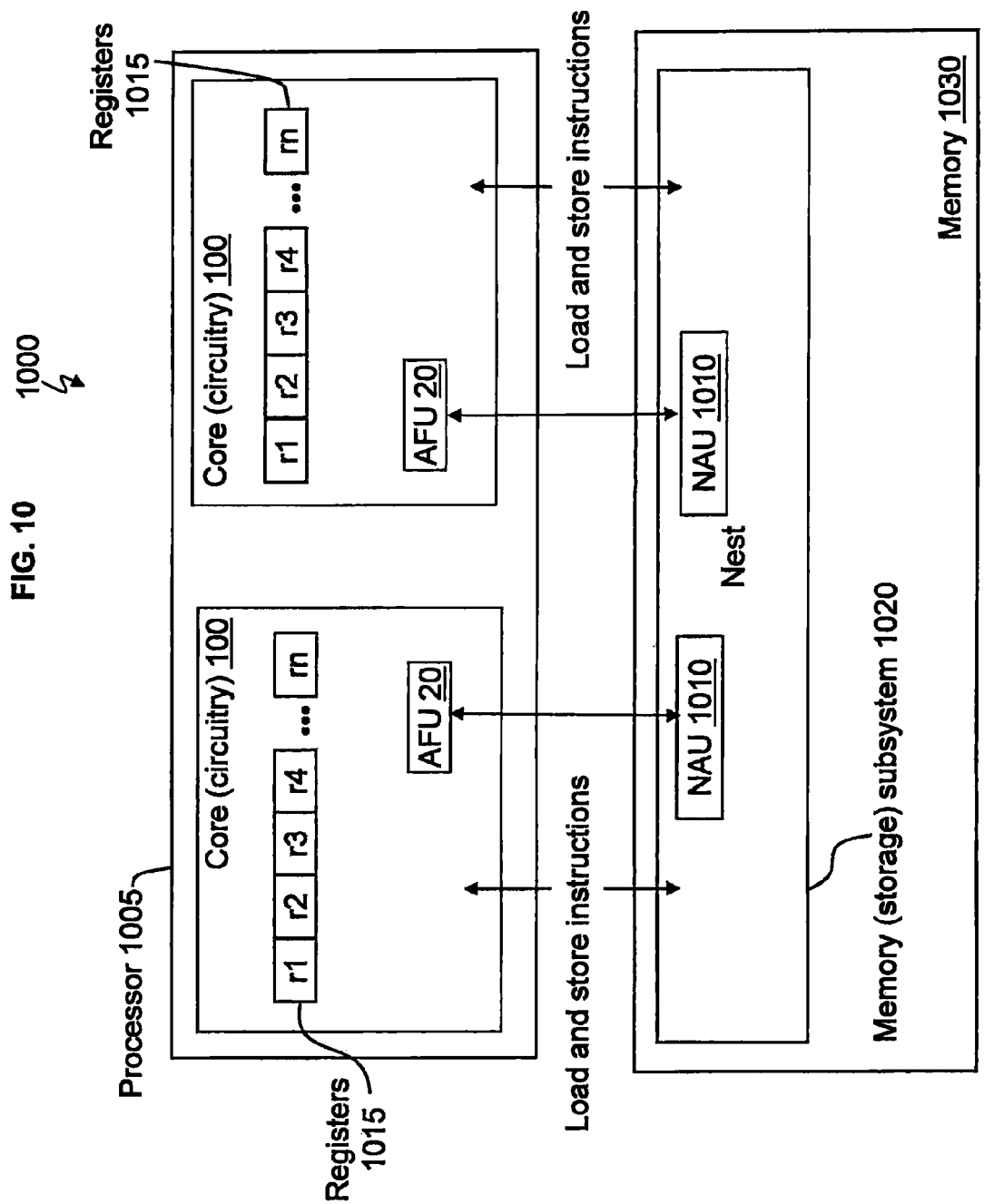
FIG. 10 is a block diagram of a processor operatively connected to a memory subsystem according to an embodiment.

FIG. 10 is a block diagram 1000 that shows two processor cores 100 (left and right) of a processor 1005 operatively connected to a memory subsystem 1020 in memory 1030 according to an embodiment. As an example, each of the processor cores 100 includes its own (identical) AFU 20. The memory subsystem 1020 is the nest that has two (identical) nest atomic units 1010. As discussed above in FIG. 9, one AFU 20 sends the single atomic internal operation to one NAU 1010 and the other AFU 20 sends its single atomic internal operation to the other NAU 1010. The memory subsystem 1020 via the NAU 1010 can perform the update of the internal atomic operation, because the NAU 1010 is configured to perform simple operations. As such, each NAU 1010 executes the respective single atomic internal operation and returns the result to its respective processor core 100.

The processor 1005 also shows registers 1015 which are registers r1 through rn (where n is the last register). In addition to the communications between the AFU 20 and the NAU 1010, load and store instructions as passed between the processor cores 100 and the memory (storage) subsystem 1020 as understood by one skilled in the art.

Figure 11:
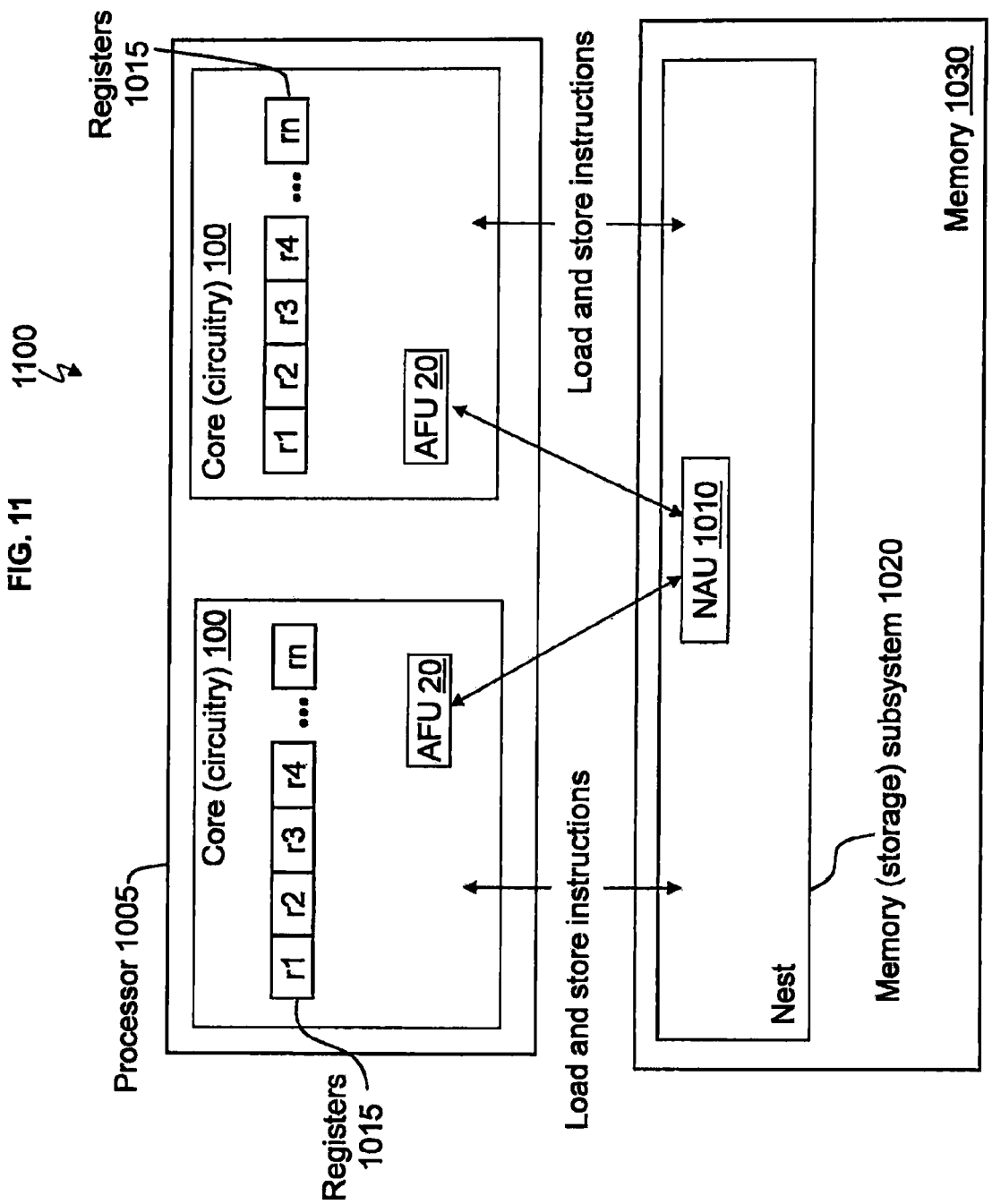
FIG. 11 is a block diagram of a processor operatively connected to a memory subsystem according to an embodiment.

FIG. 11 is a block diagram 1100 which incorporates all of the elements and operates the same as the block diagram 1000 of FIG. 10, except that the memory subsystem 1020 (only) includes a single NAU 1010. In this case, the AFU 20 in both processor cores 100 sends its respective single internal atomic operation to the NAU 1010. The NAU 1010 is configured to individually execute each internal atomic operation and send the results back to the each respective processor core 100.

In one embodiment, atomic creation of the single internal atomic operation occurs always.

In another embodiment, DTIO cannot occur, e.g., when all instructions of the atomic sequence are not in one group, and thus (the instructions) execute separately. In this case, in at least one embodiment, the instruction decoder 10 needs to reject one or more of the complex operations such as the lwarx and/or stwcx to force "cracking" or microcode execution. Also, the decoder 10 can perform instruction cache marking of the separate instructions (lwarx and stwcx) that are not in the same group to force the load reserve and store conditional into the same group (i.e., into the same atomic sequence so that this atomic sequence can be replaced as discussed herein). The load reserve and store conditional (instruction) can be marked initially, or after first being detected. The decoder 10 can unmark the load reserve and store conditional (instruction) in the instruction cache (Icache 125) if group formation of the separate load reserve and store conditional instructions are not successful repeatedly; then the decoder 10 can mark the separate load reserve and store conditional instructions to force microcode/cracking, without requiring a reject. In at least one embodiment, when DTIO does no occur to translate an atomic sequence into an atomic operation for any given atomic sequence, the atomic sequence is executed in accordance with the prior art of executing atomic sequences.

Figure 12:
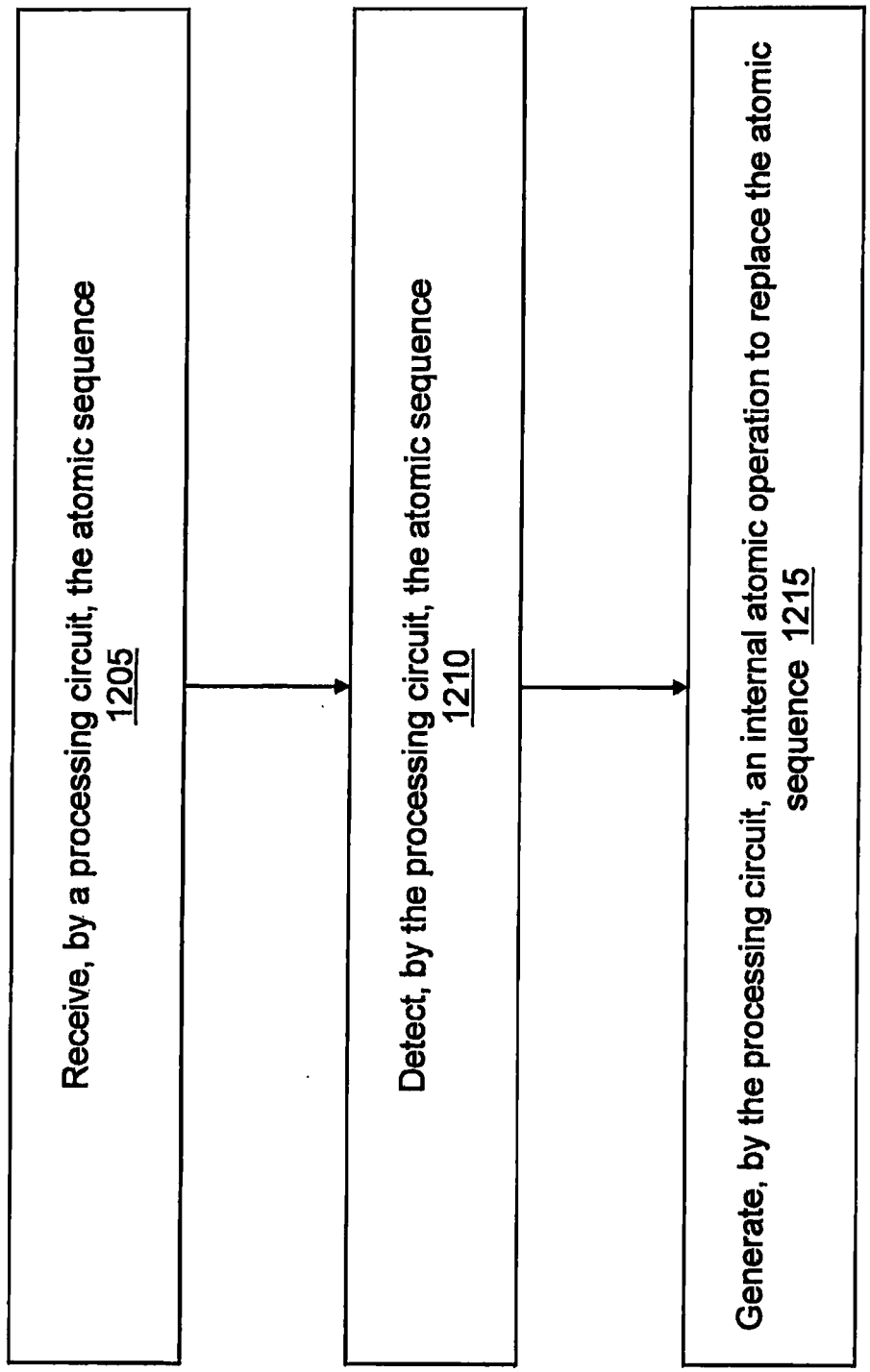
FIG. 12 is a flow chart of a method for replacing an atomic sequence with a generated internal atomic operation according to an embodiment.

FIG. 12 is a flow chart of a method 1200 for detecting and replacing an atomic sequence with an internal operation generated (at runtime and/or predecode time) according to an embodiment.

The processor core 100 (which is a processing circuit as understood by one skilled in the art) is configured via the instruction decoder 10 (this also applies to the predecode optimizer 5 as discussed herein) to receive the atomic sequence (which can be in one of the instructions 0, 1, 2, and/or 3 from the instruction cache 125) at block 1205. The processor core 100 is configured via the decoder 10 to detect the atomic sequence (e.g., via one of the OAEs 205a-205c and/or the atomic optimization analysis engine 220) at block 1210.

Although 4 instructions (e.g., instructions 0, 1, 2, and 3) and 4 decoders (e.g., decoders A, B, C, and D) have been discussed for explanation purposes, exemplary embodiments are not meant to be so limited. It is contemplated that there may be 5, 6, 7 or any desired number of decoders, and an atomic sequence to be replaced by an atomic internal operation may consist of 2, 3, 4, 5, 6 or any desired number of instructions to be replaced by the particular internal atomic operation.

The processor core 100 is configured via the decoder 10 to generate (according to the calculation/computation in the detected atomic sequence) an internal atomic operation to replace the atomic sequence at block 1215.

Further, the AFU 20 in the processor core 100 and/or the NAU 1010 in the (nest) memory subsystem 1020 is configured to execute the internal atomic operation in place of the atomic sequence. The atomic sequence includes a load reserve instruction and a store conditional instruction. The decoder 10 of the processor core 100 is configured to recognize the load reserve instruction and the store conditional instruction to detect the atomic sequence that needs to be replaced.

The internal atomic operation is a single instruction, while the atomic sequence is multiple instructions including the load reserve instruction and the store conditional instruction. Based on separate instructions of the atomic sequence not being a same group and based on the separate instructions (e.g., the load reserve instruction and the store conditional instruction) being positioned to execute separately, the instruction decoder 10 is configured to perform instruction cache marking of the separate instructions that are not in the same group to force a load reserve instruction and a store conditional instruction into the same group. As such, the instruction decoder 10 is configured to initially mark the load reserve instruction based on the load reserve instruction being detected first in the separate instructions or initially mark the store conditional instruction based on the store conditional instruction being detected first in the separate instructions. Also, the instruction decoder 10 is configured to complete formation of the same group by marking the load reserve instruction based on the load reserve instruction being detected last in the separate instructions or by marking store conditional instruction based on the store conditional instruction being detected last in the separate instructions. Further, the instruction decoder 10 is configured to translate the separate instructions having been grouped into the same group for the atomic sequence into the single internal atomic operation.

In one embodiment, when an atomic sequence is not captured in an instruction group, each instruction is executed separately in accordance with prior art. In at least one embodiment, at least one instruction such as a store conditional instruction is rejected when it is found in a decoder other than a first decoder A (in FIG. 2), unless it can be combined using DTIO into a single atomic internal operation.

Figure 13:
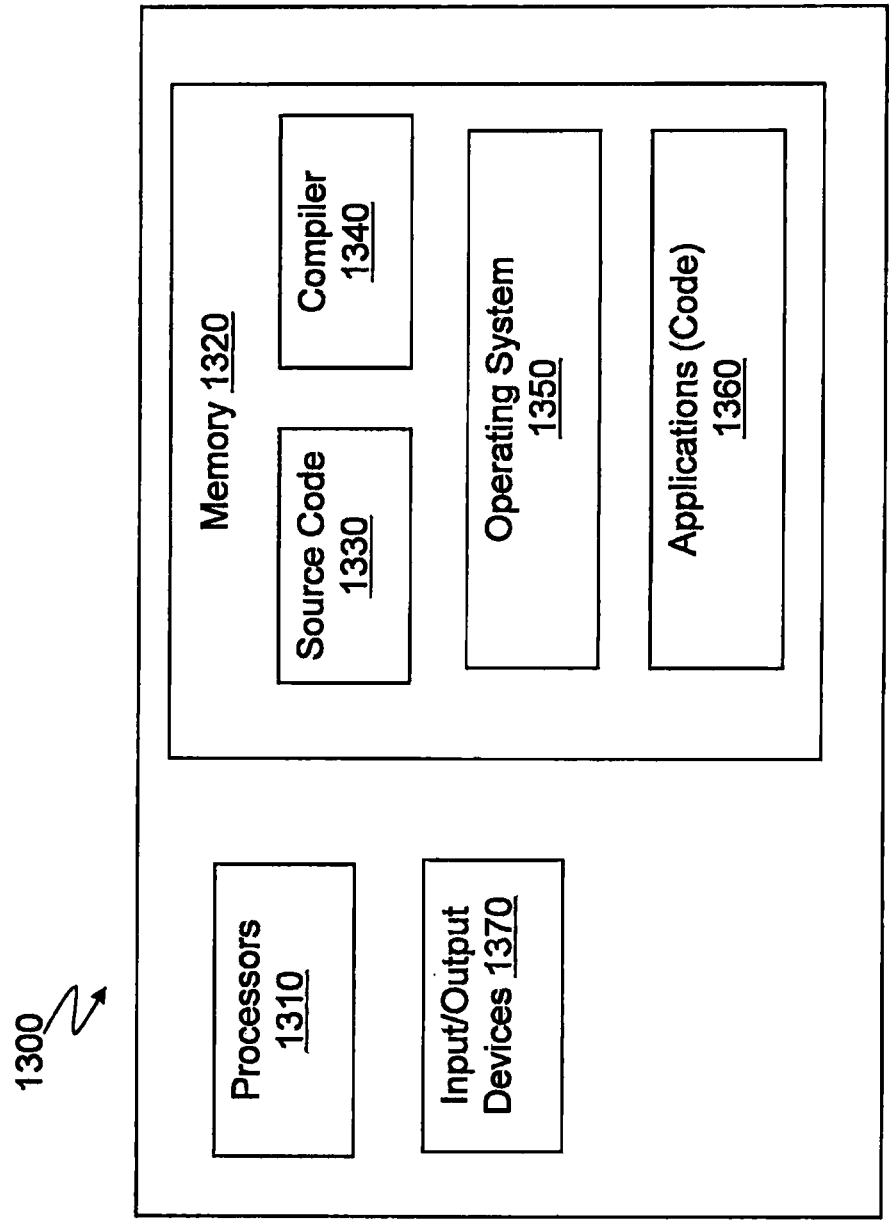
FIG. 13 illustrates an example of a computer having capabilities, which can be included in exemplary embodiments.

FIG. 13 illustrates an example of a computer 1300 having capabilities, which may be included in exemplary embodiments. Various methods, procedures, modules, flow diagrams, tools, applications, circuits, elements, and techniques discussed herein may also incorporate and/or utilize the capabilities of the computer 1300. Moreover, capabilities of the computer 1300 may be utilized to implement features of exemplary embodiments discussed herein. One or more of the capabilities of the computer 1300 may be utilized to implement, to connect to, and/or to support any element discussed herein (as understood by one skilled in the art) in FIGS. 1-12 and 14. For example, the processor core 100 may be incorporated in the processor 1310.

Generally, in terms of hardware architecture, the computer 1300 may include one or more processors 1310, computer readable storage memory 1320, and one or more input and/or output (I/O) devices 1370 that are communicatively coupled via a local interface (not shown). The local interface can be, for example but not limited to, one or more buses or other wired or wireless connections, as is known in the art. The local interface may have additional elements, such as controllers, buffers (caches), drivers, repeaters, and receivers, to enable communications. Further, the local interface may include address, control, and/or data connections to enable appropriate communications among the aforementioned components.

The processor 1310 is a hardware device for executing software that can be stored in the memory 1320. The processor 1310 can be virtually any custom made or commercially available processor, a central processing unit (CPU), a data signal processor (DSP), or an auxiliary processor among several processors associated with the computer 1300, and the processor 1310 may be a semiconductor based microprocessor (in the form of a microchip) or a macroprocessor.

The computer readable memory 1320 can include any one or combination of volatile memory elements (e.g., random access memory (RAM), such as dynamic random access memory (DRAM), static random access memory (SRAM), etc.) and nonvolatile memory elements (e.g., ROM, erasable programmable read only memory (EPROM), electronically erasable programmable read only memory (EEPROM), programmable read only memory (PROM), tape, compact disc read only memory (CD-ROM), disk, diskette, cartridge, cassette or the like, etc.). Moreover, the memory 1320 may incorporate electronic, magnetic, optical, and/or other types of storage media. Note that the memory 1320 can have a distributed architecture, where various components are situated remote from one another, but can be accessed by the processor 1310.

The software in the computer readable memory 1320 may include one or more separate programs, each of which comprises an ordered listing of executable instructions for implementing logical functions. The software in the memory 1320 includes a suitable operating system (O/S) 1350, compiler 1340, source code 1330, and one or more applications 1360 of the exemplary embodiments. As illustrated, the application 1360 comprises numerous functional components for implementing the features, processes, methods, functions, and operations of the exemplary embodiments. The application 1360 of the computer 1300 may represent numerous applications, agents, software components, modules, interfaces, controllers, etc., as discussed herein but the application 1360 is not meant to be a limitation.

The operating system 1350 may control the execution of other computer programs, and provides scheduling, input-output control, file and data management, memory management, and communication control and related services.

The application(s) 1360 may employ a service-oriented architecture, which may be a collection of services that communicate with each. Also, the service-oriented architecture allows two or more services to coordinate and/or perform activities (e.g., on behalf of one another). Each interaction between services can be self-contained and loosely coupled, so that each interaction is independent of any other interaction.

Further, the application 1360 may be a source program, executable program (object code), script, or any other entity comprising a set of instructions to be performed. When a source program, then the program is usually translated via a compiler (such as the compiler 1340), assembler, interpreter, or the like, which may or may not be included within the memory 1320, so as to operate properly in connection with the O/S 1350. Furthermore, the application 1360 can be written as (a) an object oriented programming language, which has classes of data and methods, or (b) a procedure programming language, which has routines, subroutines, and/or functions.

The I/O devices 1370 may include input devices (or peripherals) such as, for example but not limited to, a mouse, keyboard, scanner, microphone, camera, etc. Furthermore, the I/O devices 1370 may also include output devices (or peripherals), for example but not limited to, a printer, display, etc. Finally, the I/O devices 1370 may further include devices that communicate both inputs and outputs, for instance but not limited to, a NIC or modulator/demodulator (for accessing remote devices, other files, devices, systems, or a network), a radio frequency (RF) or other transceiver, a telephonic interface, a bridge, a router, etc. The I/O devices 1370 also include components for communicating over various networks, such as the Internet or an intranet. The I/O devices 1370 may be connected to and/or communicate with the processor 1310 utilizing Bluetooth connections and cables (via, e.g., Universal Serial Bus (USB) ports, serial ports, parallel ports, FireWire, HDMI (High-Definition Multimedia Interface), etc.).

When the computer 1300 is in operation, the processor 1310 is configured to execute software stored within the memory 1320, to communicate data to and from the memory 1320, and to generally control operations of the computer 1300 pursuant to the software. The application 1360 and the O/S 1350 are read, in whole or in part, by the processor 1310, perhaps buffered within the processor 1310, and then executed.

When the application 1360 is implemented in software it should be noted that the application 1360 can be stored on virtually any computer readable storage medium for use by or in connection with any computer related system or method. In the context of this document, a computer readable storage medium may be an electronic, magnetic, optical, or other physical device or means that can contain or store a computer program for use by or in connection with a computer related system or method.

The application 1360 can be embodied in any computer-readable medium 1320 for use by or in connection with an instruction execution system, apparatus, server, or device, such as a computer-based system, processor-containing system, or other system that can fetch the instructions from the instruction execution system, apparatus, or device and execute the instructions. In the context of this document, a "computer-readable storage medium" can be any means that can store, read, write, communicate, or transport the program for use by or in connection with the instruction execution system, apparatus, or device. The computer readable medium can be, for example but not limited to, an electronic, magnetic, optical, or semiconductor system, apparatus, or device.

More specific examples (a nonexhaustive list) of the computer-readable medium 1320 would include the following: an electrical connection (electronic) having one or more wires, a portable computer diskette (magnetic or optical), a random access memory (RAM) (electronic), a read-only memory (ROM) (electronic), an erasable programmable read-only memory (EPROM, EEPROM, or Flash memory) (electronic), an optical fiber (optical), and a portable compact disc memory (CDROM, CD R/W) (optical).

In exemplary embodiments, where the application 1360 is implemented in hardware, the application 1360 can be implemented with any one or a combination of the following technologies, which are each well known in the art: a discrete logic circuit(s) having logic gates for implementing logic functions upon data signals, an application specific integrated circuit (ASIC) having appropriate combinational logic gates, a programmable gate array(s) (PGA), a field programmable gate array (FPGA), etc.

It is understood that the computer 1300 includes non-limiting examples of software and hardware components that may be included in various devices, servers, and systems discussed herein, and it is understood that additional software and hardware components may be included in the various devices and systems discussed in exemplary embodiments.

Figure 14:
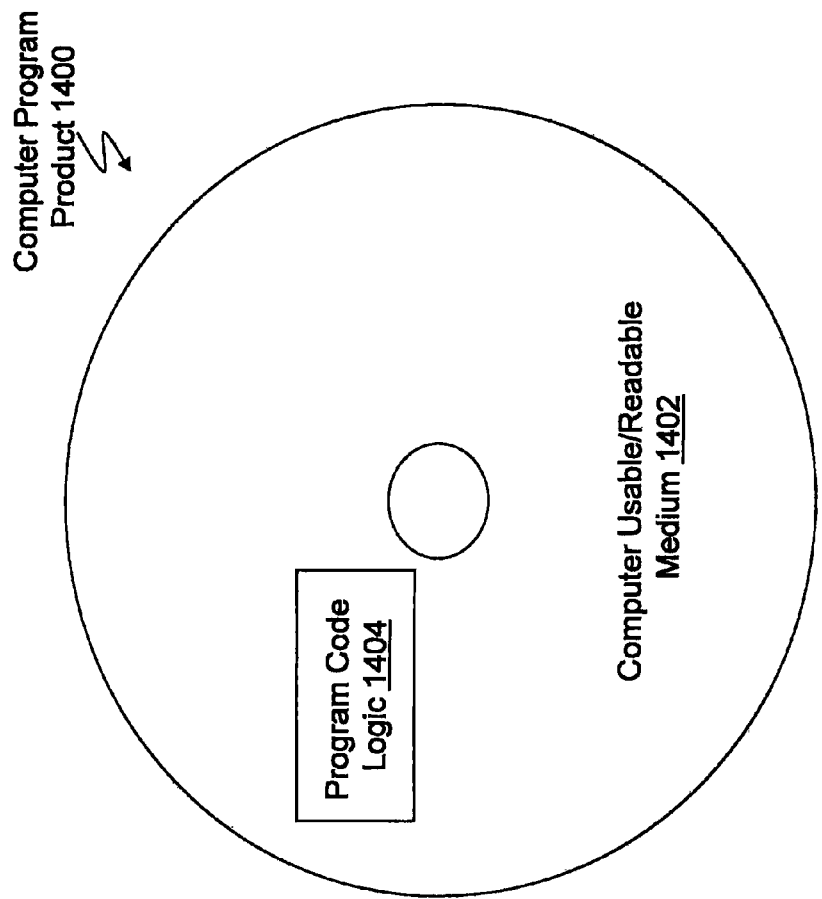
FIG. 14 illustrates a computer program product in accordance with an embodiment.

As described above, embodiments can be embodied in the form of computer-implemented processes and apparatuses for practicing those processes. An embodiment may include a computer program product 1400 as depicted in FIG. 14 on a computer readable/usable medium 1402 with computer program code logic 1404 containing instructions embodied in tangible media as an article of manufacture. Exemplary articles of manufacture for computer readable/usable medium 1402 may include floppy diskettes, CD-ROMs, hard drives, universal serial bus (USB) flash drives, or any other computer-readable storage medium, wherein, when the computer program code logic 1404 is loaded into and executed by a computer, the computer becomes an apparatus for practicing the invention. Embodiments include computer program code logic 1404, for example, whether stored in a storage medium, loaded into and/or executed by a computer, or transmitted over some transmission medium, such as over electrical wiring or cabling, through fiber optics, or via electromagnetic radiation, wherein, when the computer program code logic 1404 is loaded into and executed by a computer, the computer becomes an apparatus for practicing the invention. When implemented on a general-purpose microprocessor, the computer program code logic 1404 segments configure the microprocessor to create specific logic circuits.

Technical effects and benefits include reducing processing time. The code in exemplary detected atomic sequences discussed herein (e.g., such as the code in FIGS. 3 and 4) may suffer from delay issues. These delay issues in the code are that two "roundtrips" to the coherence point may be needed, i.e., multiple processor cycles will be spent for the lwarx and stwcx instructions, respectively, to first load, and the conditionally update a value at the coherence point. In comparison, a memory-nest-(internal) atomic operation (generated by the decoder 10) where the operation to be performed is transmitted to the memory nest (i.e., memory subsystem 1020) may require only one roundtrip to both send (by the AFU 20) the request with any parameters, and to receive the result (back at the processor core 100).

In the state of the art, when memory locations (in memory 1030 or registers 1015) are heavily contended, additional, complex logic is necessary to prevent livelock and starvation, where none of the competing processing cores can complete the synchronization code successfully of the atomic sequence with the lwarx and stwcx instructions. However, to avoid this, embodiments offer internal atomic operations, like atomic exchange, atomic increment, etc, when they can be implemented in a high performance memory subsystem 1020 (e.g., for legacy processors). Accordingly, a sequence of instructions describing a memory synchronization operation using load reserve and store conditional is transformed to an internal memory subsystem operation (i.e., internal atomic operation) using decode time instruction optimization.

The terminology used herein is for the purpose of describing particular embodiments only and is not intended to be limiting of the invention. As used herein, the singular forms "a", an and the are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described above with reference to flowchart illustrations and/or schematic diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

As described above, embodiments can be embodied in the form of computer-implemented processes and apparatuses for practicing those processes. In embodiments, the invention is embodied in computer program code executed by one or more network elements. Embodiments include a computer program product on a computer usable medium with computer program code logic containing instructions embodied in tangible media as an article of manufacture. Exemplary articles of manufacture for computer usable medium may include floppy diskettes, CD-ROMs, hard drives, universal serial bus (USB) flash drives, or any other computer-readable storage medium, wherein, when the computer program code logic is loaded into and executed by a computer, the computer becomes an apparatus for practicing the invention. Embodiments include computer program code logic, for example, whether stored in a storage medium, loaded into and/or executed by a computer, or transmitted over some transmission medium, such as over electrical wiring or cabling, through fiber optics, or via electromagnetic radiation, wherein, when the computer program code logic is loaded into and executed by a computer, the computer becomes an apparatus for practicing the invention. When implemented on a general-purpose microprocessor, the computer program code logic segments configure the microprocessor to create specific logic circuits.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

What is claimed is:

1. A computer implemented method for replacing an atomic sequence, the method comprising:
   receiving, by a processing circuit, the atomic sequence;
   detecting, by the processing circuit, the atomic sequence; and
   generating, by the processing circuit, an internal atomic operation to replace the atomic sequence;
   based on separate instructions of the atomic sequence not being a same group and based on the separate instructions being positioned to execute separately, configuring an instruction decoder to perform instruction cache marking of the separate instructions that are not in the same group to force a load reserve instruction and a store conditional instruction into the same group;

configuring the instruction decoder to initially mark the load reserve instruction based on the load reserve instruction being detected first in the separate instructions or initially mark the store conditional instruction based on the store conditional instruction being detected first in the separate instructions;

configuring the instruction decoder to complete formation of the same group by marking the load reserve instruction based on the load reserve instruction being detected last in the separate instructions or by marking the store conditional instruction based on the store conditional instruction being detected last in the separate instructions; and configuring the instruction decode to translate the separate instructions having been grouped into the same group for the atomic sequence into the internal atomic operation.

2. The computer implemented method of claim 1, further comprising executing the internal atomic operation in place of the atomic sequence.

3. The computer implemented method of claim 1, wherein the atomic sequence comprises a load reserve instruction and a store conditional instruction.

4. The computer implemented method of claim 3, wherein detecting the atomic sequence comprises recognizing the load reserve instruction and the store conditional instruction to detect the atomic sequence that needs to be replaced.

5. The computer implemented method of claim 1, wherein a predecode optimizer is configured to detect the atomic sequence and generate the internal atomic operation prior to caching by an instruction cache.

6. The computer implemented method of claim 1, wherein the internal atomic operation is executed in at least one of a memory subsystem and an atomic function unit.

* * * * *